(12) United States Patent
Chen

(10) Patent No.: US 10,816,718 B2
(45) Date of Patent: Oct. 27, 2020

(54) DISPLAY DEVICE AND ASSEMBLING METHOD THEREOF

(71) Applicant: Qisda Corporation, Taoyuan (TW)

(72) Inventor: Hsiao-Yun Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/560,941

(22) Filed: Sep. 4, 2019

(65) Prior Publication Data
US 2020/0116922 A1 Apr. 16, 2020

(30) Foreign Application Priority Data
Oct. 16, 2018 (TW) .............................. 107136414 A

(51) Int. Cl.
F21V 8/00 (2006.01)
(52) U.S. Cl.
CPC ........... G02B 6/0088 (2013.01); G02B 6/005 (2013.01); G02B 6/0065 (2013.01); G02B 6/0091 (2013.01); G02B 6/0081 (2013.01)
(58) Field of Classification Search
CPC ............. G02B 6/0088; G02F 1/133308; G02F 2001/133314; G02F 2001/133317
See application file for complete search history.

(56) References Cited

U.S. PATENT DOCUMENTS

| 9,766,488 B2* | 9/2017 | Nishi | G02B 6/0088 |
| 2014/0204310 A1* | 7/2014 | Lee | G02F 1/133308 349/62 |
| 2014/0285747 A1* | 9/2014 | Jun | G02F 1/133308 349/58 |
| 2015/0116628 A1* | 4/2015 | Huang | G02B 6/0091 349/58 |
| 2016/0026031 A1* | 1/2016 | Lee | G02F 1/133308 349/65 |
| 2016/0341886 A1* | 11/2016 | Zhou | G02B 6/0088 |

FOREIGN PATENT DOCUMENTS

| TW | 200846764 A | 12/2008 |
| TW | 201303424 A1 | 1/2013 |

OTHER PUBLICATIONS

Office action of counterpart application by Taiwan IP Office dated Sep. 20, 2019.

* cited by examiner

Primary Examiner — William N Harris

(57) ABSTRACT

A display device including a back plate, a light emitting module, a light guide plate and a fixing member is provided. The back plate has an inner surface and an outer surface opposite to the inner surface. The light emitting module is disposed on a side of the inner surface of the back plate. The light guide plate is disposed opposite to the inner surface of the back plate. The fixing member includes a portion, which leans on the outer surface of the back plate.

16 Claims, 6 Drawing Sheets

DISPLAY DEVICE AND ASSEMBLING METHOD THEREOF

This application claims the benefit of Taiwan application Serial No. 107136414, filed Oct. 16, 2018, the subject matter of which is incorporated herein by reference.

BACKGROUND OF THE INVENTION

Field of the Invention

The invention relates in general to a display device and an assembling method thereof, and more particularly to a display device with fixing member and an assembling method thereof.

Description of the Related Art

Generally speaking, the display device includes a light emitting module, a light guide plate and a fixing member. In order to fix the light guide plate, the two ends of the fixing member clamp the light guide plate and a reflector. During the assembly process, the light emitting module is assembled to the inside of the fixing member along the long side direction of the light emitting module. To satisfy such assembly, the light emitting module and the fixing member must be separated by a spacer to avoid the light emitting module and the fixing member generating friction with each other during the assembly process. however, since the light emitting module and the fixing member must be separated by a spacer, it becomes very difficult to reduce the thickness of the display device.

Therefore, it has become a prominent task for the industries to provide a new structure of display device to resolve the above problems.

SUMMARY OF THE INVENTION

The invention is directed to a display device and an assembling method thereof capable of resolving the generally known problems disclosed above.

According to one embodiment of the present invention, a display device is provided. The display device includes a back plate, a light emitting module, a light guide plate and a fixing member. The back plate has an inner surface and an outer surface opposite to the inner surface. The light emitting module is disposed on a side of the inner surface of the back plate. The light guide plate is disposed opposite to the inner surface of the back plate. The fixing member includes a first portion, which leans on the outer surface of the back plate.

According to another embodiment of the present invention, an assembling method of display device is provided. The assembling method includes the following steps. A back plate is provided, wherein the back plate has an inner surface and an outer surface opposite to the inner surface. A light emitting module is disposed on a side of the inner surface of the back plate along a first assembling direction substantially perpendicular to the inner surface. A light guide plate is disposed opposite to the inner surface of the back plate along the first assembling direction. The back plate and the light emitting module are fixed by a fixing member along a second assembling direction, wherein the fixing member includes a first portion, which leans on the outer surface of the back plate.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
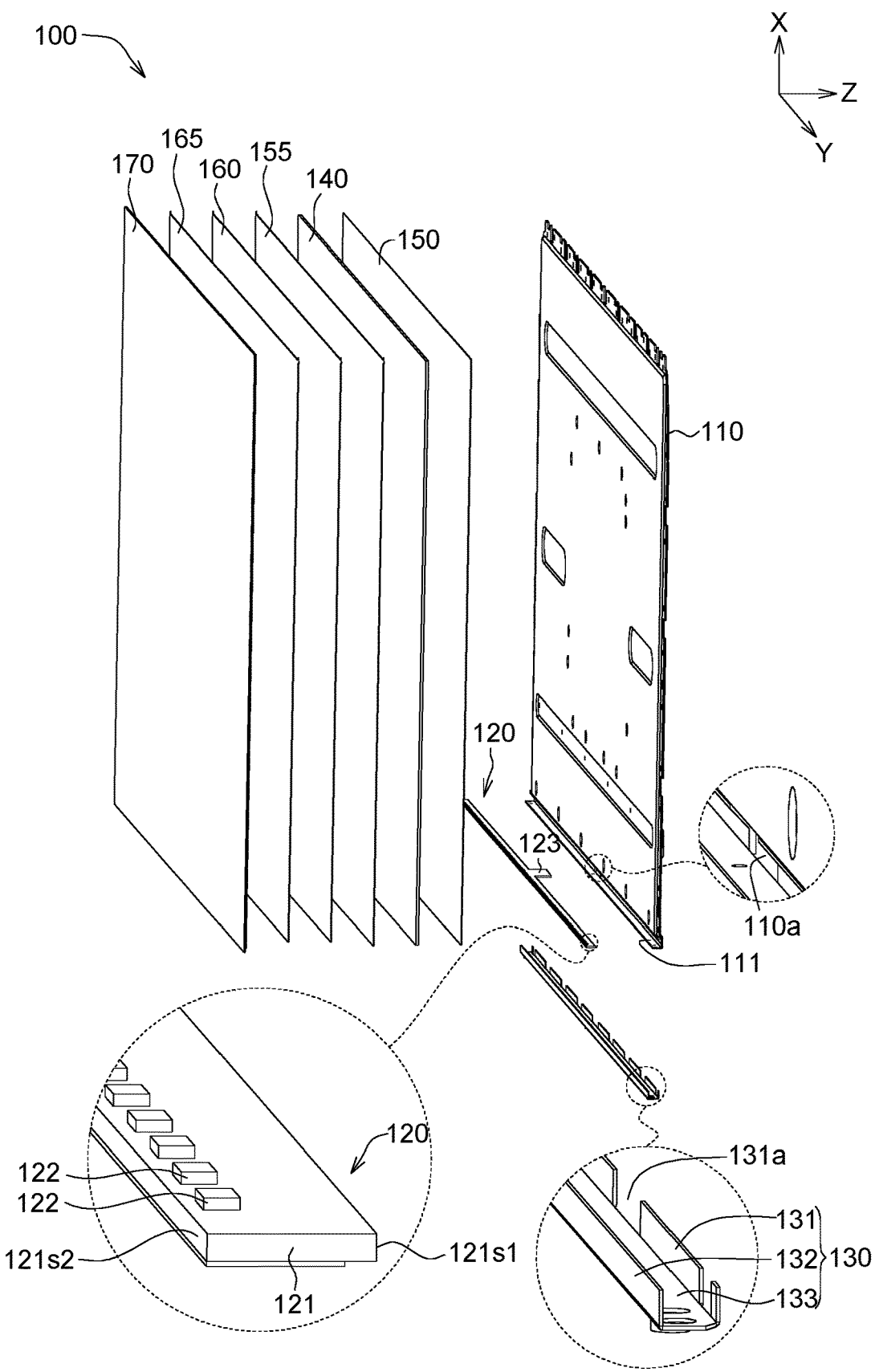
FIG. 1 is an explosion diagram of a display device according to an embodiment of the present invention.
Figure 2:
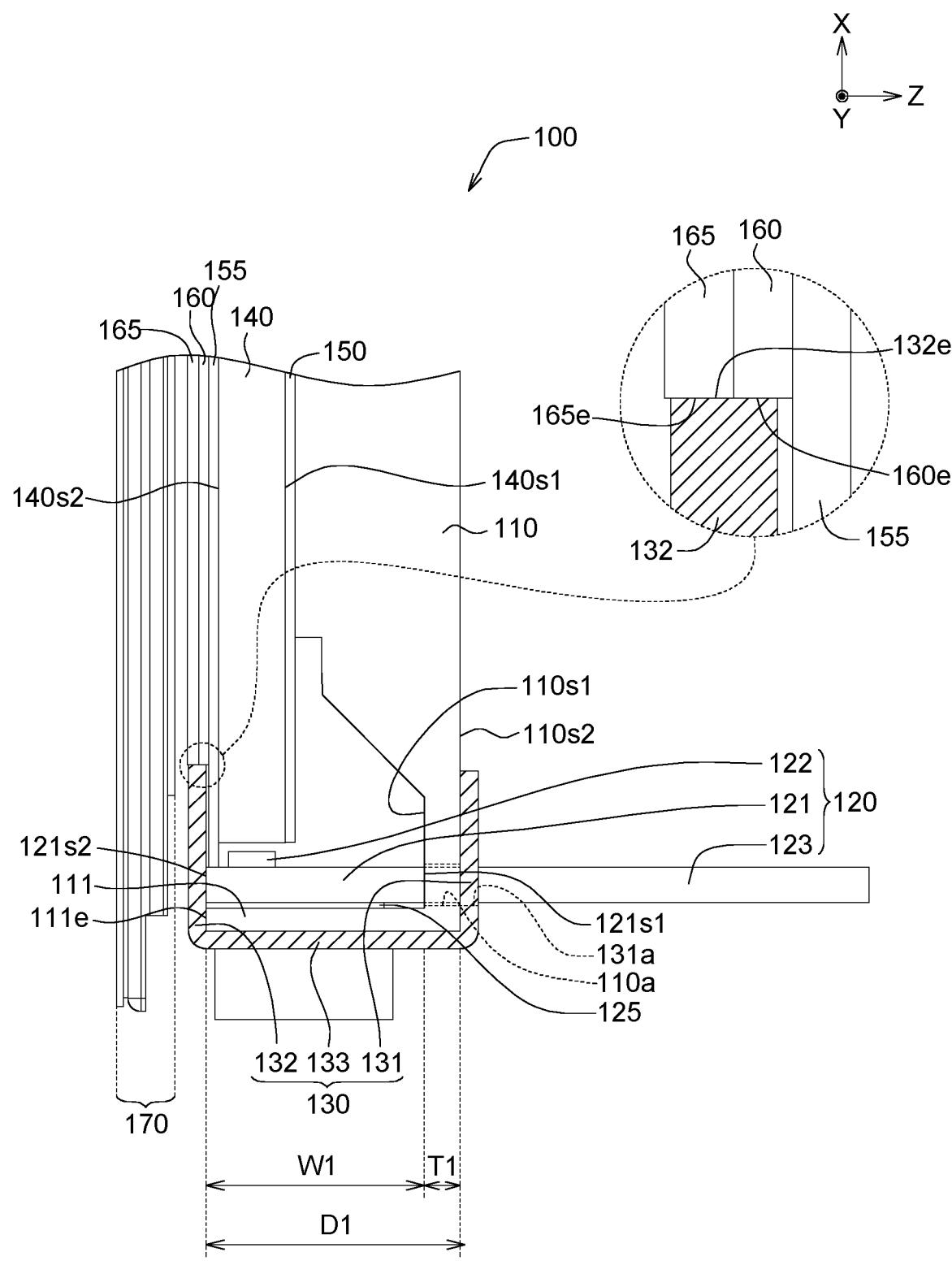
FIG. 2 is a partial side view of the display device of FIG. 1 after assembly.

Refer to FIGS. 1 and 2. FIG. 1 is an explosion diagram of a display device 100 according to an embodiment of the present invention. FIG. 2 is a partial side view of the display device 100 of FIG. 1 after assembly.

The display device 100 includes a back plate 110, a light emitting module 120, a fixing member 130, a light guide plate 140, a first optical film 150, a second optical film 155, a third optical film 160, a fourth optical film 165 and a display panel 170.

The back plate 110 has an inner surface $110s1$ and an outer surface $110s2$ opposite to the inner surface $110s1$. The light emitting module 120 is disposed on a side of the inner surface $110s1$ of the back plate 110. The light guide plate 140 is disposed opposite to the inner surface $110s1$ of the back plate 110. The fixing member 130 includes a first portion 131, which leans on the outer surface $110s2$ of the back plate 110, and therefore stabilizes and fixes the back plate 110. In an embodiment, the back plate 110 may include a plate and a dissipation member disposed on the plate. In terms of relative position, the plate can be disposed between the first optical film 150 and the dissipation member, and the dissipation member can be disposed between the plate and the first portion 131 of the fixing member 130, wherein the first optical film 150 may contact the plate, and the first portion 131 may contact the dissipation member. Besides, the plate can be a metal plate or a plastic plate, and the dissipation member can be formed of a material with superior thermal conductivity.

The back plate 110 includes a back plate lateral portion 111. The fixing member 130 includes a fixing member lateral portion 133, a first portion 131 and a second portion 132 opposite to the first portion 131. The fixing member lateral portion 133 connects the first portion 131 and the second portion 132. The fixing member lateral portion 133 of the fixing member 130 is disposed opposite to the back plate lateral portion 111 of the back plate 110, and the light emitting module 120 is disposed opposite to the back plate lateral portion 111. In the present embodiment, the light emitting module 120 can be fixed on the back plate lateral portion 111 through an adhering member 125, and the back plate lateral portion 111 is disposed between the light emitting module 120 and the fixing member lateral portion 133.

As indicated in FIG. 2, the first portion 131 and the second portion 132 are respectively connected to two sides of the fixing member lateral portion 133 to form a U-shaped cross-sectional structure. The back plate 110 and the light emitting module 120 are clamped within the U-shaped cross-sectional structure. Moreover, the fixing member 130 can reflect the light (not illustrated) emitted by the light emitting module 120 back to the light guide plate 140. For example, the light can be reflected by the reflective layer coated on the inner surface of the fixing member 130 or the fixing member 130 having reflective property. In the present example, the fixing member 130 can be used as a lamp mask.

As indicated in FIGS. 1 and 2, the light emitting module 120 includes a circuit board 121, at least one light emitting element 122 and a connector 123. The light emitting element 122 is disposed on the circuit board 121. The connector 123 is electrically connected to the traces on the circuit board 121 (the traces are not illustrated), such that the light emitting element 122 on the circuit board 121 can be controlled by an external circuit through the connector 123. The circuit board 121 has a first lateral surface 121s1 and a second lateral surface 121s2 opposite to the first lateral surface 121s1, wherein the first lateral surface 121s1 leans on the inner surface 110s1 of the back plate 110. The first lateral surface 121s1 and the second lateral surface 121s2 cannot be seen from the view angle of FIG. 2 and therefore are not illustrated. The second lateral surface 121s2 leans on the fixing member 130. For example, the second lateral surface 121s2 leans on the inner surface of the second portion 132 of the fixing member 130. Thus, the fixing member 130 can press the back plate 110 and the circuit board 121 between the first portion 131 and the second portion 132 of the fixing member 130. Since no spacer is disposed between the first lateral surface 121s1 of the circuit board 121 and the back plate 110 (because the first lateral surface 121s1 leans on the back plate 110), and no spacer is disposed between the second lateral surface 121s2 of the circuit board 121 and the fixing member 130 either (because the second lateral surface 121s2 leans on the fixing member 130), the thickness of the display device 100 can be effectively reduced, and the technical effect of thinning the display device can be achieved.

In an embodiment, when the fixing member 130 is in an initial state (for example, the fixing member 130 has not yet been assembled to the back plate 110 and the light emitting module 120), the minimum distance D1 between the first portion 131 and the second portion 132 is less than or slightly less than the sum of the width W1 of the circuit board 121 plus the thickness T1 between the inner surface 110s1 and the outer surface 110s2 of the back plate 110. Thus, after the fixing member 130, the light emitting module 120 and the back plate 110 are assembled together, the fixing member 130 can press the back plate 110 and the circuit board 121 between the first portion 131 and the second portion 132 to fix relative position between the fixing member 130, the light emitting module 120 and the back plate 110.

As indicated in FIG. 2, the back plate lateral portion 111 of the back plate 110 has a terminal surface 111e, which leans on the fixing member 130. For example, the terminal surface 111e leans on the inner surface of the second portion 132 of the fixing member 130. Thus, the terminal surface 111e of the back plate lateral portion 111 and the outer surface 110s2 of the back plate 110 are pressed between the first portion 131 and the second portion 132 to fix relative position between the back plate 110 and the fixing member 130.

As indicated in FIGS. 1 and 2, the connector 123 is extended along the shorter side of the circuit board 121. The back plate 110 has an opening 110a extended between the inner surface 110s1 and the outer surface 110s2. The connector 123 of the light emitting module 120 passes through the opening 110a. Since the opening 110a allows the connector 123 to pass through, when the light emitting module 120 is assembled to the back plate 110 along the first assembling direction (the Z-axis direction), the connector 123 of the light emitting module 120 will not over-interfere with the back plate 110. The first assembling direction is a direction through which the connector 123 passes the opening 110a or a direction substantially facing upwards and perpendicular to the inner surface 110s1. The first assembling direction depends on the position of the back plate 110. For example, when the inner surface 110s1 of the back plate 110 faces upwards, the first assembling direction is a downward direction, but the present invention is not limited thereto.

Moreover, the first portion 131 of the fixing member 130 has at least an opening 131a, which also allows the connector 123 to pass through and achieve similar effects disclosed above. Besides, a locking member (such as a screw) can pass through another opening 131a of the fixing member 130 to be locked on the back plate 110 to fix relative position between the back plate 110 and the fixing member 130.

As indicated in FIGS. 1 and 2, the light guide plate 140 has a first light guide surface 140s1 and a second light guide surface 140s2 opposite to the first light guide surface 140s1. The first light guide surface 140s1 faces the inner surface 110s1 of the back plate 110. The first optical film 150 and the second optical film 155 are respectively disposed on the first light guide surface 140s1 and the second light guide surface 140s2. The second portion 132 of the fixing member 130, the first optical film 150 and the second optical film 155 are stacked along the thickness direction of the light guide plate 140. In an embodiment, the first optical film 150 and the second optical film 155 can be realized by diffuser films, reflective films or other suitable optical films.

As indicated in FIGS. 1 and 2, the third optical film 160 is disposed between the second optical film 155 and the fourth optical film 165. The third optical film 160 and the fourth optical film 165 respectively have terminal surfaces 160e and 165e. The terminal surfaces 160e and 165e face the terminal surface of the fixing member 130, such as the terminal surface 132e facing the second portion 132. In an embodiment, the terminal surfaces 160e and/or 165e may lean on the terminal surface 132e of the second portion 132 or may be separated from the terminal surface 132e by a distance. In an embodiment, the third optical film 160 can be a prism sheet and the fourth optical film 165 can be a light collecting sheet, but the present invention is not limited thereto.

Referring to FIGS. 3A to 3H, assembly processes of the display device 100 of FIG. 1 are shown.

Figure 3A:
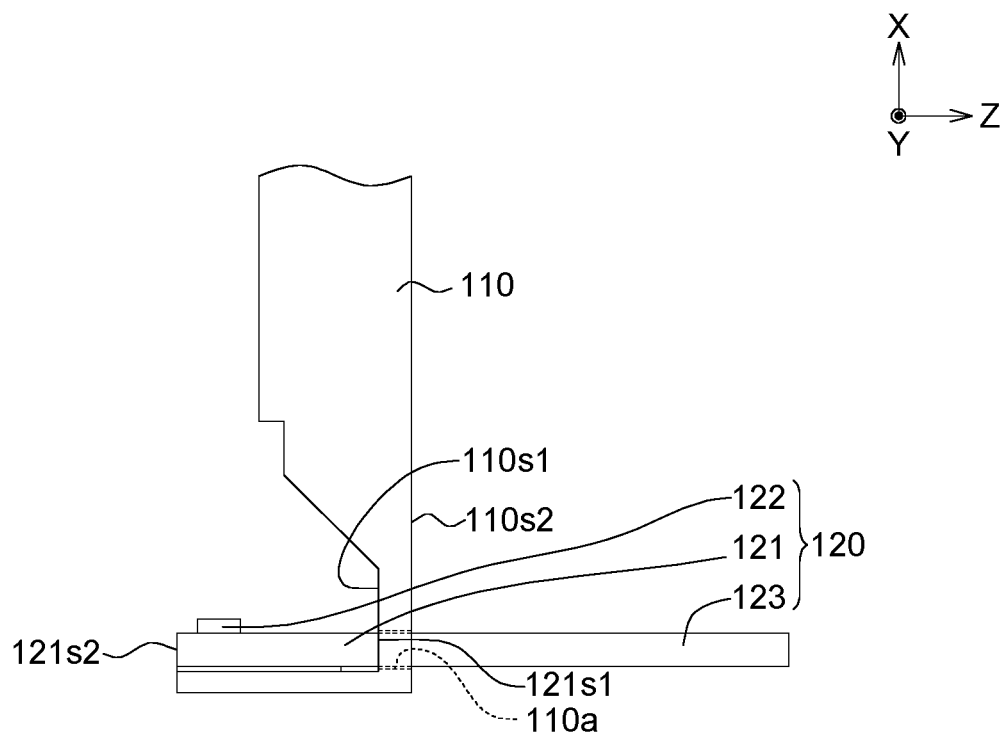
FIGS. 3A to 3H are assembly processes of the display device of FIG. 1.

As indicated in FIG. 3A, a back plate 110 is provided, wherein the back plate 110 has an inner surface 110s1 and an outer surface 110s2 opposite to the inner surface 110s1. Subsequent elements (except for the fixing member 130) can be assembled to the back plate 110 along the first assembling direction. In an embodiment, the inner surface 110s1 of the back plate 110 faces upwards, such that the first assembling direction is a downward direction.

Then, a light emitting module 120 is disposed on a side of the inner surface 110s1 of the back plate 110 along a first assembling direction substantially perpendicular to the inner surface 110s1. The light emitting module 120 includes a circuit board 121, at least one light emitting element 122 and a connector 123. The light emitting element 122 is disposed on the circuit board 121. The connector 123 is electrically connected to the traces on the circuit board 121 (the traces are not illustrated), such that the light emitting element 122 on the circuit board 121 can be controlled by an external circuit through the connector 123. The circuit board 121 has a first lateral surface 121s1 and a second lateral surface 121s2 opposite to the first lateral surface 121s1. The first lateral surface 121s1 leans on the inner surface 110s1 of the back plate 110. Besides, the back plate 110 has an opening 110a. The light emitting module 120 can be assembled to the back plate 110 with the connector 123 passing through the opening 110a. Thus, during the assembly process, the connector 123 will not interfere with the physical material of the back plate 110.

Figure 3B:
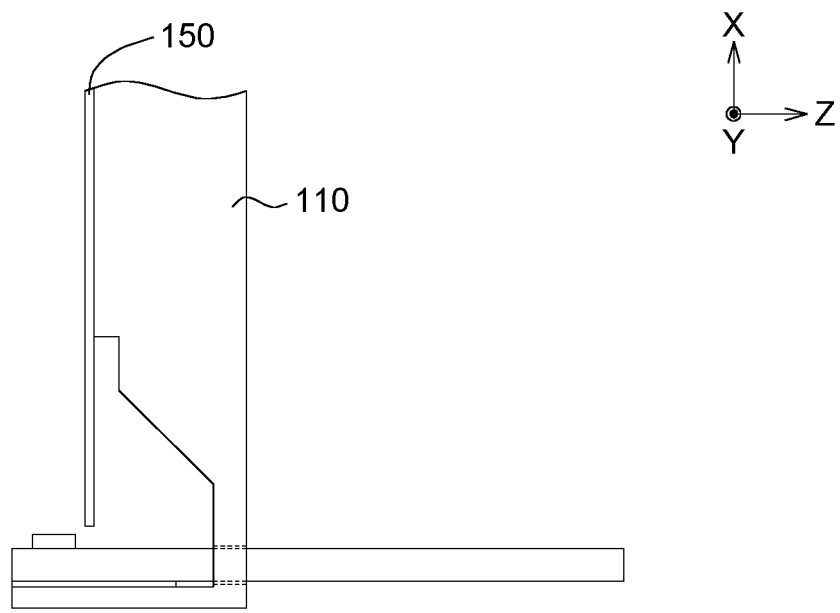

As indicated in FIG. 3B, a first optical film 150 is disposed on the back plate 110 along the first assembling direction.

Figure 3C:
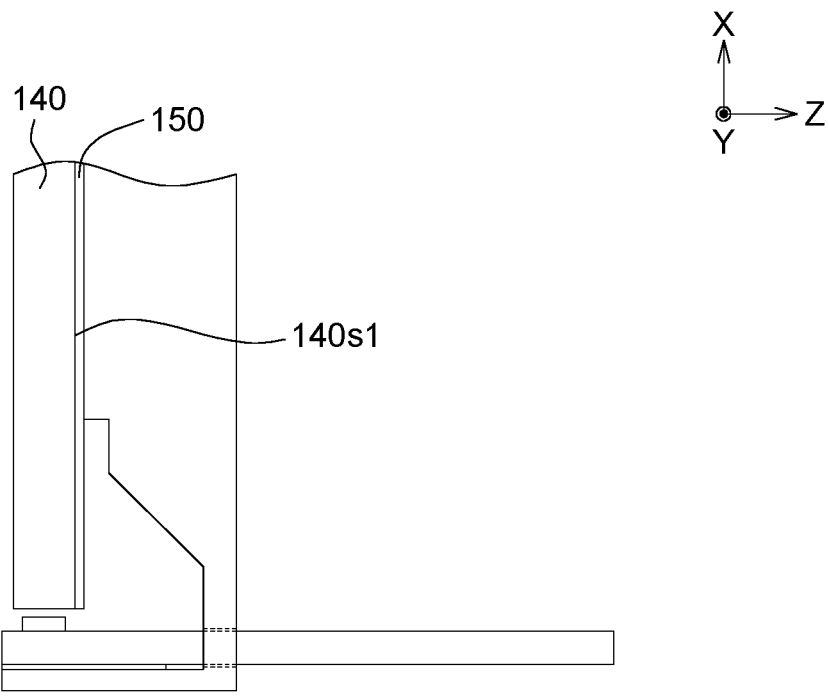

As indicated in FIG. 3C, a light guide plate 140 is disposed on the first optical film 150 along the first assembling direction, wherein the first optical film 150 is disposed on the first light guide surface 140s1 of the light guide plate 140.

Figure 3D:
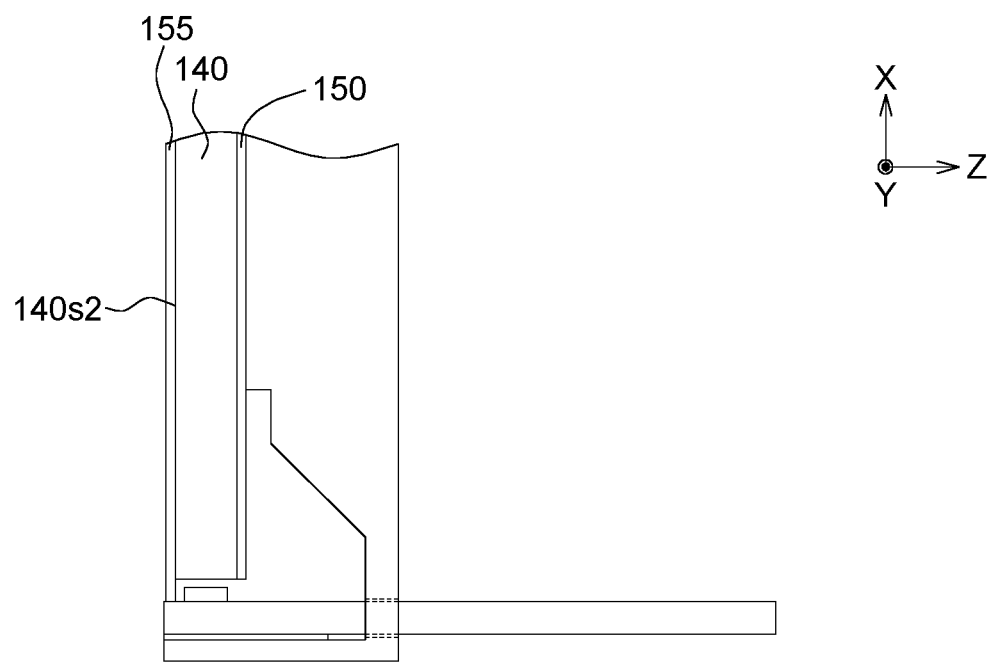

As indicated in FIG. 3D, a second optical film 155 is disposed on the second light guide surface 140s2 of the light guide plate 140 along the first assembling direction.

Figure 3E:
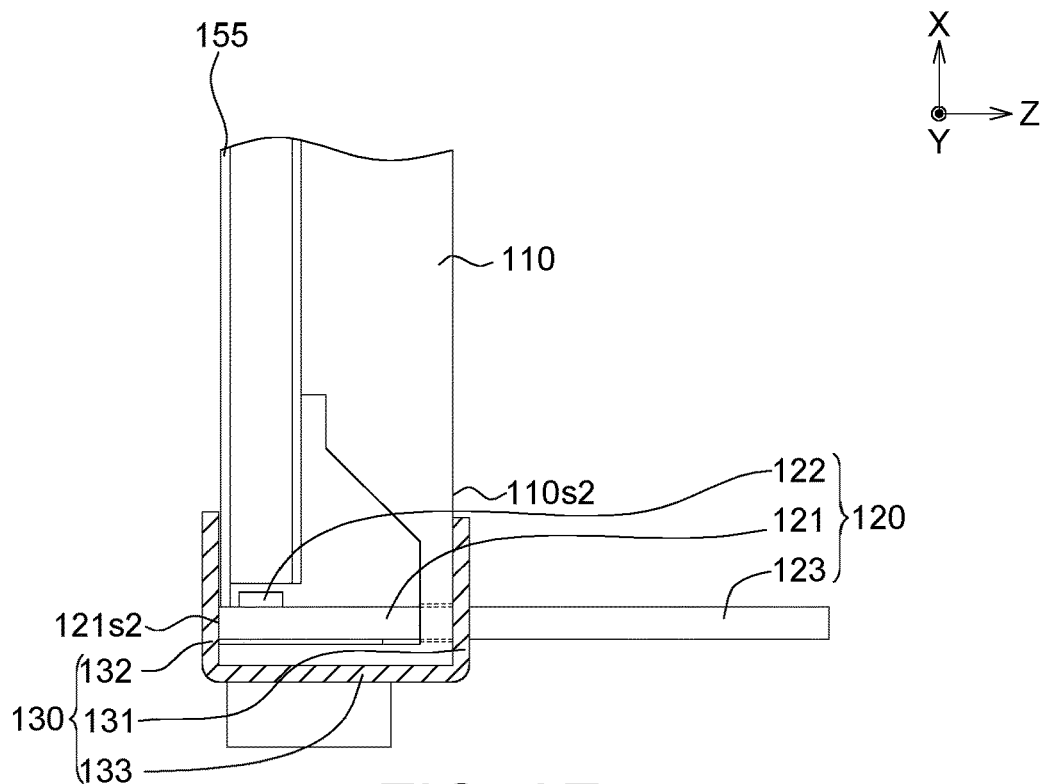

As indicated in FIG. 3E, the back plate 110 and the light emitting module 120 are fixed by a fixing member 130 along a second assembling direction (the X-axis direction) substantially perpendicular to the first assembling direction. The second assembling direction is substantially parallel to the shorter side direction of the fixing member 130 (the X-axis direction), such that the fixing member 130 can be assembled to the back plate 110 and the light emitting module 120 through a shorter assembly course. Since the assembly course is shorter, the fixing member 130 can be quickly assembled to the back plate 110 and the light emitting module 120. Since the fixing member 130 can be assembled to the back plate 110 and the light emitting module 120 through a shorter assembly course, the assembly will not be severely affected even when the fixing member 130, the back plate 110 and the light emitting module 120 interfere with each other during the assembly process (such as friction).

The fixing member 130 includes a fixing member lateral portion 133, a first portion 131 and a second portion 132 opposite to the first portion 131. The first portion 131 leans on the outer surface 110s2 of the back plate 110, and the second portion 132 leans on the second lateral surface 121s2 of the circuit board 121. Thus, the fixing member 130 can press the back plate 110 and the circuit board 121 between the first portion 131 and the second portion 132 of the fixing member 130.

Although it is not illustrated in the diagrams, at least one locking element can pass through the fixing member lateral portion 133 of the fixing member 130 to be locked on the back plate 110 to fix relative position between the back plate 110 and the fixing member 130.

Figure 3F:
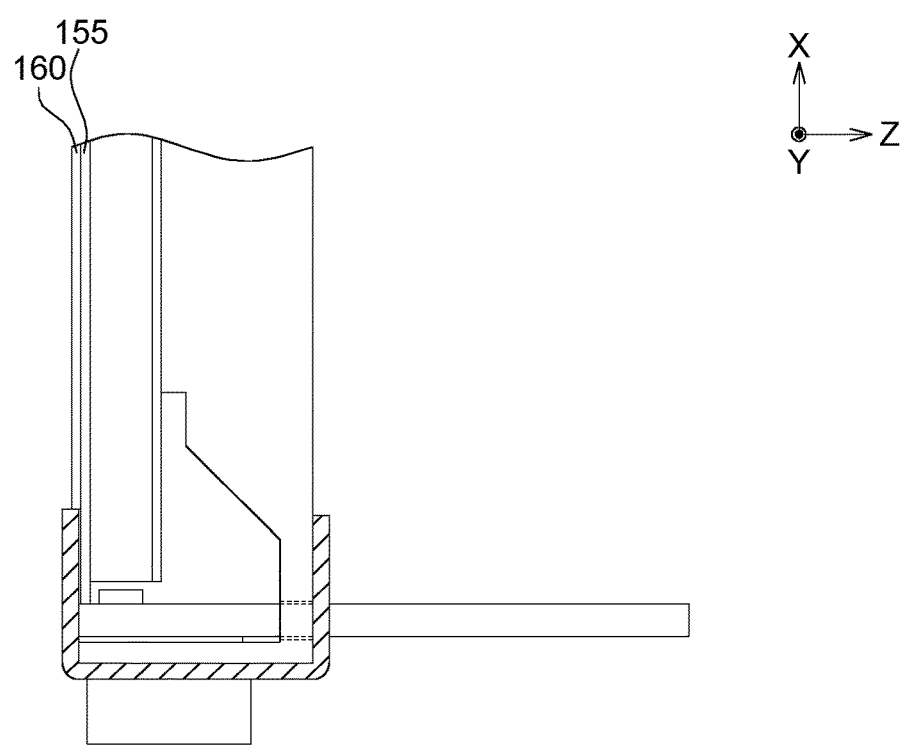

As indicated in FIG. 3F, a third optical film 160 is disposed on the second optical film 155 along the first assembling direction.

Figure 3G:
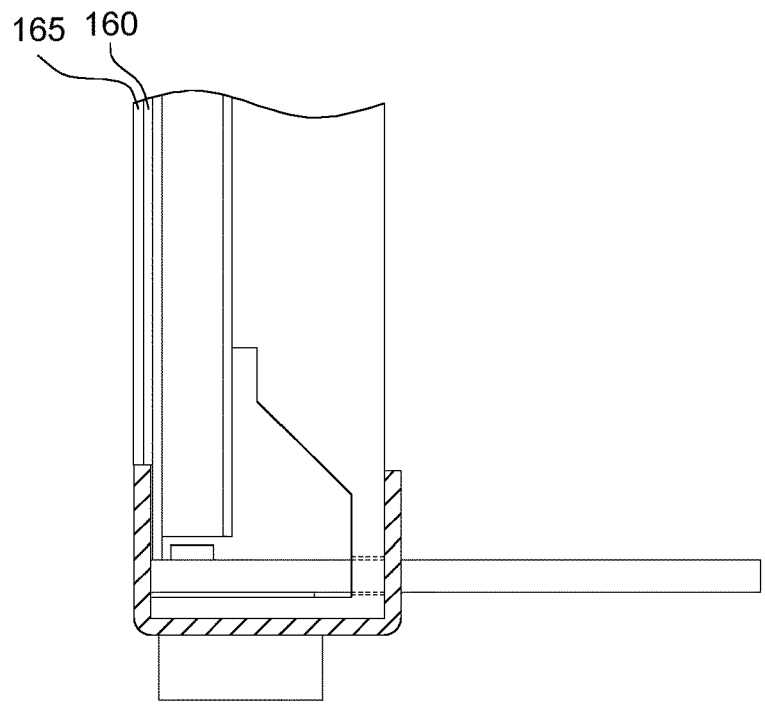

As indicated in FIG. 3G, a fourth optical film 165 is disposed on the third optical film 160 along the first assembling direction.

Figure 3H:
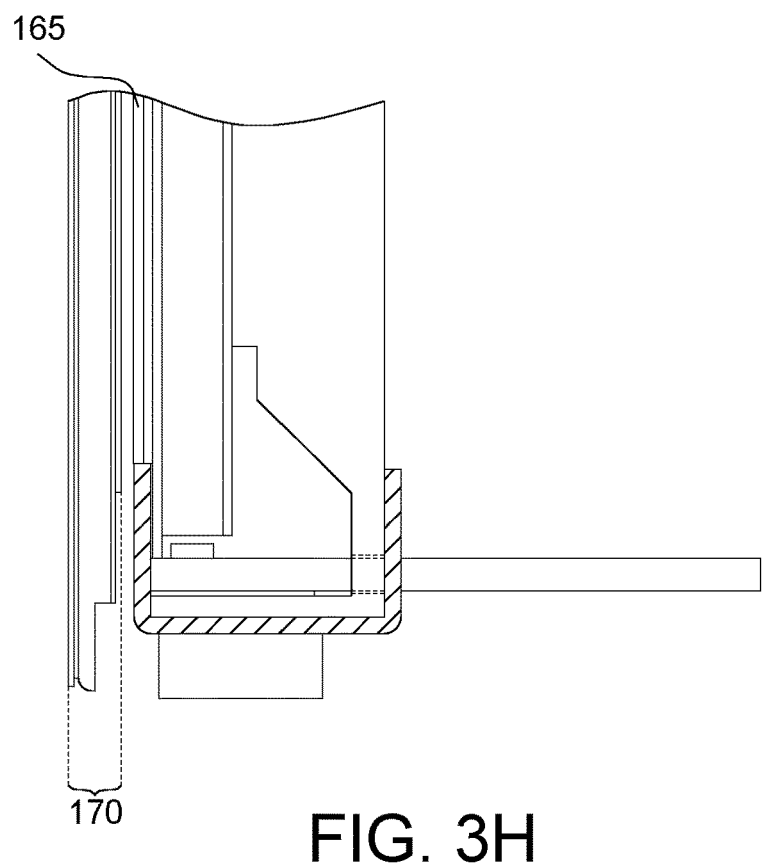

As indicated in FIG. 3H, a display panel 170 is disposed opposite to the fourth optical film 165 along the first assembling direction. Thus, the assembly of the display device 100 of FIG. 2 is completed.

Although it is not illustrated in the diagrams, the display panel 170 can be disposed on a plastic frame. The plastic frame can be disposed on the back plate 110 beforehand, and the display panel 170 is disposed on the plastic frame afterwards. In the present embodiment, the display panel 170 can be realized by a liquid crystal display panel, but the present invention is not limited thereto.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
   a back plate having an inner surface and an outer surface opposite to the inner surface;
   a light emitting module disposed on a side of the inner surface of the back plate;
   a light guide plate disposed opposite to the inner surface of the back plate; and
   a fixing member, comprising a first portion, wherein the fixing member leans on the outer surface of the back plate, wherein the light emitting module comprises a circuit board, the fixing member further comprises a second portion opposite to the first portion, the fixing member presses the back plate and the circuit board between the first portion and the second portion of the fixing member.

2. The display device according to claim 1, wherein the back plate comprises a back plate lateral portion, the fixing member further comprises a fixing member lateral portion, the first portion and the second portion opposite to the first portion, the fixing member lateral portion connects the first portion and the second portion, and the back plate lateral portion is disposed between the light emitting module and the fixing member lateral portion.

3. The display device according to claim 2, wherein the first portion and the second portion are respectively connected to two ends of the fixing member lateral portion to form a U-shaped cross-sectional structure.

4. The display device according to claim 1, further comprising an optical film, the light guide plate has a first light guide surface and a second light guide surface opposite to the first light guide surface, the first light guide surface faces the inner surface, and the optical film has a lateral surface, which faces a terminal surface of the fixing member.

5. The display device according to claim 1, further comprising an optical film, wherein the light guide plate has a first light guide surface and a second light guide surface opposite to the first light guide surface, the first light guide surface faces the inner surface of the back plate, the optical film is disposed on the second light guide surface, and a portion of the fixing member overlaps the optical film along a thickness direction of the light guide plate.

6. The display device according to claim 1, wherein the back plate has a terminal surface, which leans on an inner surface of the fixing member.

7. The display device according to claim 1, wherein the back plate has an opening, and the light emitting module comprises a connector, which passes through the opening.

8. The display device according to claim 2, wherein the back plate comprises a back plate lateral portion, the back plate lateral portion has a terminal surface leaning on an inner surface of the fixing member.

9. The display device according to claim 2, wherein a minimum distance between the first portion and the second portion of the fixing member is less than a sum of a width of the circuit board plus a thickness between the inner surface and the outer surface of the back plate.

10. The display device according to claim 2, further comprising an optical film having a terminal surface, and the terminal surface of the optical film leans on a terminal surface of the second portion.

11. An assembling method of display device, comprising:
  providing a back plate, wherein the back plate has an inner surface and an outer surface opposite to the inner surface;
  disposing a light emitting module on a side of the inner surface of the back plate along a first assembling direction substantially perpendicular to the inner surface;
  disposing a light guide plate opposite the inner surface of the back plate along the first assembling direction;
  fixing the back plate and the light emitting module by a fixing member along a second assembling direction, wherein the fixing member comprises a first portion, which leans on the outer surface of the back plate, wherein the light emitting module comprises a circuit board, the fixing member further comprises a second portion opposite to the first portion, the fixing member presses the back plate and the circuit board between the first portion and the second portion of the fixing member.

12. The assembling method according to claim 11, wherein the second assembling direction is substantially perpendicular to the first assembling direction.

13. The assembling method according to claim 11, wherein the first assembling direction is a downward direction.

14. The assembling method according to claim 11, wherein in the step of fixing the back plate and the light emitting module by the fixing member along the second assembling direction, the back plate comprises a back plate lateral portion, the fixing member further comprises a fixing member lateral portion, the first portion and the second portion opposite to the first portion, the fixing member lateral portion connects the first portion and the second portion, and the back plate lateral portion is disposed between the light emitting module and the fixing member lateral portion.

15. The assembling method according to claim 14, wherein in the step of fixing the back plate and the light emitting module by the fixing member along the second assembling direction, the back plate comprises a back plate lateral portion, the back plate lateral portion has a terminal surface leaning on an inner surface of the fixing member.

16. The assembling method according to claim 14, wherein in the step of fixing the back plate and the light emitting module by the fixing member along the second assembling direction, a minimum distance between the first portion and the second portion is less than a sum of a width of the circuit board plus a thickness between the inner surface and the outer surface of the back plate.

* * * * *